US011904483B2

(12) United States Patent
Ooba

(10) Patent No.: US 11,904,483 B2
(45) Date of Patent: Feb. 20, 2024

(54) WORK ROBOT SYSTEM

(71) Applicant: FANUC CORPORATION, Yamanashi (JP)

(72) Inventor: Masafumi Ooba, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 17/847,651

(22) Filed: Jun. 23, 2022

(65) Prior Publication Data

US 2022/0324118 A1 Oct. 13, 2022

Related U.S. Application Data

(63) Continuation of application No. 16/245,593, filed on Jan. 11, 2019, now Pat. No. 11,407,115.

(30) Foreign Application Priority Data

Feb. 8, 2018 (JP) .................. 2018-021181

(51) Int. Cl.
*B25J 9/16* (2006.01)
*G05B 19/19* (2006.01)
(Continued)

(52) U.S. Cl.
CPC ........... *B25J 9/1697* (2013.01); *B25J 9/1633* (2013.01); *B25J 13/08* (2013.01); *G05B 19/19* (2013.01);
(Continued)

(58) Field of Classification Search
CPC ...... B25J 9/1697; B25J 9/0093; B25J 13/085; B25J 9/1633; B65G 47/905; B65G 2203/042; Y02P 90/02
See application file for complete search history.

(56) References Cited

U.S. PATENT DOCUMENTS 3,576,540 A * 4/1971 Fair .................... G05B 19/4187
408/69
6,278,906 B1 * 8/2001 Piepmeier .............. B25J 9/1607
700/59
(Continued)

FOREIGN PATENT DOCUMENTS

CN 106272416 A 1/2017
CN 106272424 A 1/2017
(Continued)

OTHER PUBLICATIONS

Japanese Office Action dated Jan. 21, 2020, in connection with corresponding JP Application No. 2018-021181 (7 pgs., including machine-generated English translation).
(Continued)

*Primary Examiner* — Stephen Holwerda
(74) *Attorney, Agent, or Firm* — Maier & Maier, PLLC

(57) ABSTRACT

A work robot system including a conveying apparatus that conveys an object, a robot that performs a predetermined task on a target portion of the object being conveyed by the conveying apparatus, a controller that controls the robot, a sensor that is attached to the robot and successively detects a position, relative to the robot, of the target portion of the object being conveyed by the conveying apparatus, and a force detector that detects a force generated by a contact between the object and a part supported by the robot. When the robot is performing the predetermined task, the controller performs force control based on a detection value of the force detector while controlling the robot by using a detection result of the sensor.

14 Claims, 5 Drawing Sheets

(51) Int. Cl.
  *H04N 23/00* (2023.01)
  *B25J 13/08* (2006.01)
(52) U.S. Cl.
  CPC ... *H04N 23/00* (2023.01); *G05B 2219/39045* (2013.01); *G05B 2219/39102* (2013.01); *G05B 2219/39529* (2013.01)

(56) References Cited

U.S. PATENT DOCUMENTS

| | | | |
|---|---|---|---|
| 6,681,151 | B1 | 1/2004 | Weinzimmer et al. |
| 2003/0051326 | A1 | 3/2003 | Lawson et al. |
| 2005/0075752 | A1* | 4/2005 | Ban .................. G05B 19/4182 700/213 |
| 2005/0177989 | A1 | 8/2005 | Lawson et al. |
| 2006/0111810 | A1 | 5/2006 | Kim et al. |
| 2007/0007924 | A1* | 1/2007 | Nishihara .......... G05B 19/4182 318/560 |
| 2007/0107183 | A1 | 5/2007 | Lawson et al. |
| 2010/0017033 | A1* | 1/2010 | Boca .................. B25J 19/023 901/46 |
| 2011/0087360 | A1* | 4/2011 | Chen .................. B25J 9/1697 700/114 |
| 2011/0208347 | A1 | 8/2011 | Otake et al. |
| 2012/0323358 | A1* | 12/2012 | Izumi .................. G06V 10/26 901/50 |
| 2018/0193102 | A1 | 7/2018 | Inoue |
| 2018/0370023 | A1 | 12/2018 | Ooba |
| 2019/0275678 | A1* | 9/2019 | Takeuchi ............ B25J 9/163 |

FOREIGN PATENT DOCUMENTS

| | | |
|---|---|---|
| CN | 106737697 A | 5/2017 |
| EP | 1405690 B1 | 4/2017 |
| EP | 3 326 566 A1 | 5/2018 |
| JP | S61-243514 A | 10/1986 |
| JP | H08-72764 A | 3/1996 |
| JP | H08-286701 A | 11/1996 |
| JP | H09-72717 A | 3/1997 |
| JP | 2002-018754 A | 1/2002 |
| JP | 2011-073128 A | 4/2011 |
| JP | 2011-110620 A | 6/2011 |
| JP | 2011-167831 A | 9/2011 |
| JP | 2019-005856 A | 1/2019 |
| WO | 2017/014303 A1 | 1/2017 |

OTHER PUBLICATIONS

Japanese Search Report dated Jan. 14, 2020, in connection with corresponding JP Application No. 2018-021181 (22 pgs., including machine-generated English translation).

Japanese Office Action dated Apr. 21, 2020, in connection with corresponding JP Application No. 2018-021181 (7 pgs., including machine-generated English translation).

U.S. Appl. No. 16/245,573, Masafumi Ooba, filed Jan. 11, 2019.

Office Action issued dated Oct. 19, 2021, in connection with corresponding German Application No. 102019102859.0 (10 pp., including machine-generated English translation).

* cited by examiner

WORK ROBOT SYSTEM

CROSS-REFERENCE TO RELATED APPLICATIONS

This application is based on a continuation application of U.S. patent application Ser. No. 16/245,593, filed on Jan. 11, 2019, and claims priority to Japanese Patent Application No. 2018-021181 filed on Feb. 8, 2018, the entire content of which is incorporated herein by reference.

FIELD

The present invention relates to a work robot system.

BACKGROUND

It has been often the case that, to attach a part to an object conveyed by a conveying apparatus, the conveying apparatus is stopped. In particular, to attach a part to a large object, such as a vehicle body, with precision, the transfer of the object by the conveying apparatus needs to be stopped. In some cases, this results in deterioration of the working efficiency.

On the other hand, a production line including a robot, a conveying apparatus that conveys an object, rails provided along the conveying apparatus, and a moving device that moves the robot along the rails, is known (e.g., see Japanese Unexamined Patent Application, Publication No. H08-72764). In this production line, the robot performs a defect inspection and polishing on the object while the object is conveyed by the conveying apparatus. Moreover, while the defect inspection and polishing are performed, the moving device moves the robot along the rails at the same speed as a speed at which the object is conveyed by the conveying apparatus.

SUMMARY

A work robot system of an aspect of the present invention includes: a conveying apparatus that conveys an object; a robot that performs a predetermined task on a target portion of the object being conveyed by the conveying apparatus; a controller that controls the robot; a sensor that is attached to the robot and detects a position, relative to the robot, of the target portion of the object being conveyed by the conveying apparatus; and a force detector that detects a force generated by contact between the object and a part or a tool supported by the robot, wherein when the robot is performing the predetermined task, the controller performs force control based on a detection value of the force detector while controlling the robot by using a detection result of the sensor.

DETAILED DESCRIPTION

A work robot system 1 according to an embodiment of the present invention will be described below by using the drawings.

Figure 1:
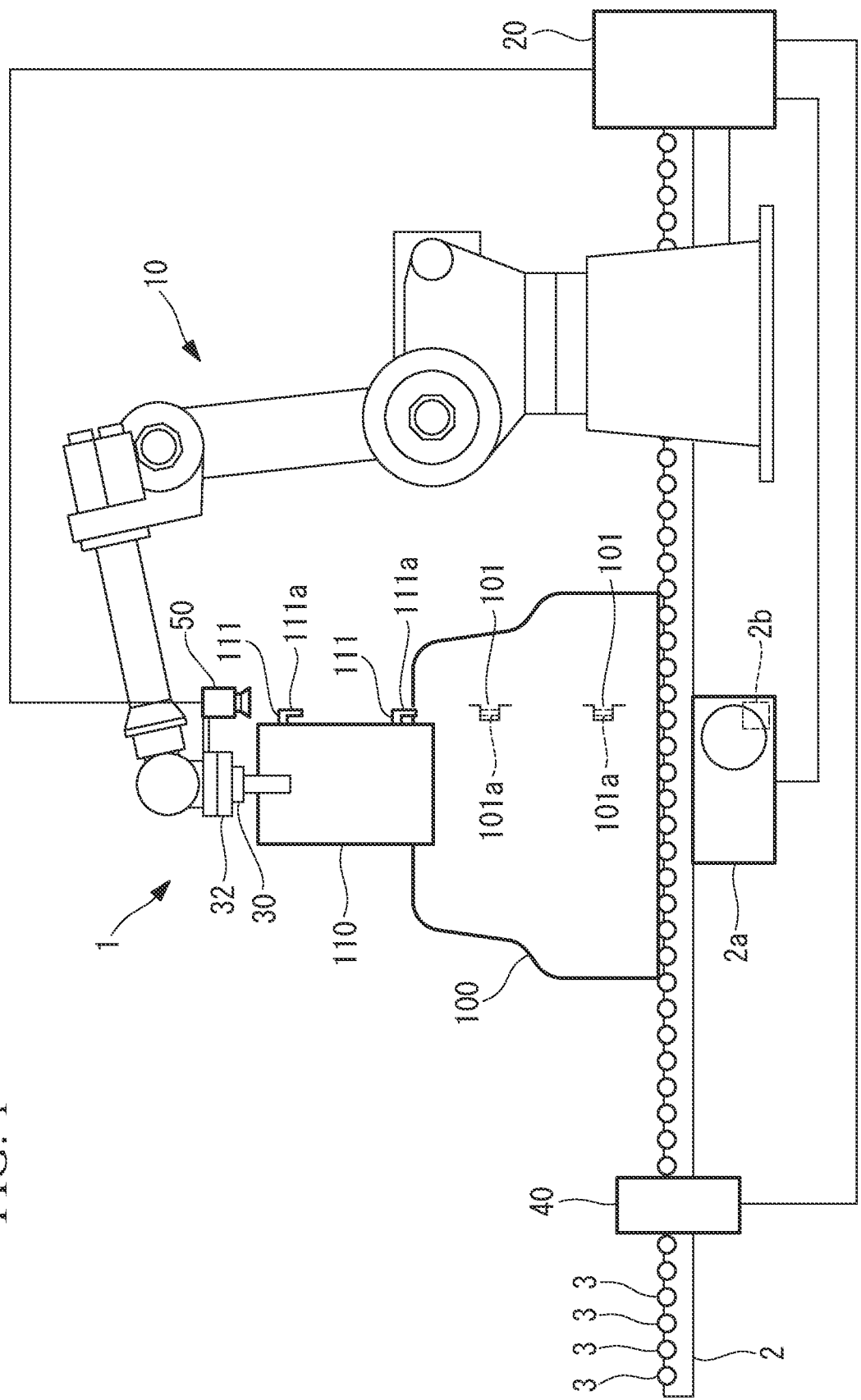
FIG. 1 is a schematic configuration diagram of a work robot system of an embodiment of the present invention.

As shown in FIG. 1, the work robot system 1 of this embodiment includes: a conveying apparatus 2 that conveys an object 100 that is an object to be worked on; a robot 10 that performs predetermined task on target portions 101 of the object 100 being conveyed by the conveying apparatus 2; a control apparatus 20 that controls the robot 10; a detection apparatus 40 as a detector; and a sensor 50 mounted on the robot 10.

The detection apparatus 40 detects that the object 100 has been conveyed to a predetermined position. The detection apparatus 40 may acquire data by which positions and orientations of the target portions 101 of the object 100 being conveyed by the conveying apparatus 2 can be specified. Any device that has this function can be used as the detection apparatus 40. In this embodiment, the detection apparatus 40 is a photoelectric sensor. In this case, the detection apparatus 40 detects that the object 100 has been conveyed to a position at which the detection apparatus 40 is installed.

While the object 100 is not limited to a specific type of object, in this embodiment, for example, the object 100 is a vehicle body. The conveying apparatus 2 conveys the object 100 by driving some of a plurality of rollers 3 by means of a motor 2a, and in this embodiment, the conveying apparatus 2 conveys the object 100 toward the right side in FIG. 1. The motor 2a may include an operating position detection device 2b. The operating position detection device 2b successively detects a rotation position and a rotation amount of an output shaft of the motor 2a. For example, the operating position detection device 2b is an encoder. A detection value of the operating position detection device 2b is transmitted to the control apparatus 20.

The target portions 101 are portions of the object 100 on which the robot 10 performs the predetermined task. In this embodiment, as the predetermined task, a hand 30 of the robot 10 lifts up a part 110 and the robot 10 attaches attachment portions 111 of the part 110 onto the target portions 101. Thus, for example, shafts 111a extending downward from the attachment portions 111 of the part 110 are fitted into holes 101a provided in the target portions 101 of the object 100.

The robot 10 attaches the attachment portions 111 of the part 110 onto the target portions 101 in a state where the object 100 is being moved by the conveying apparatus 2.

Figure 2:
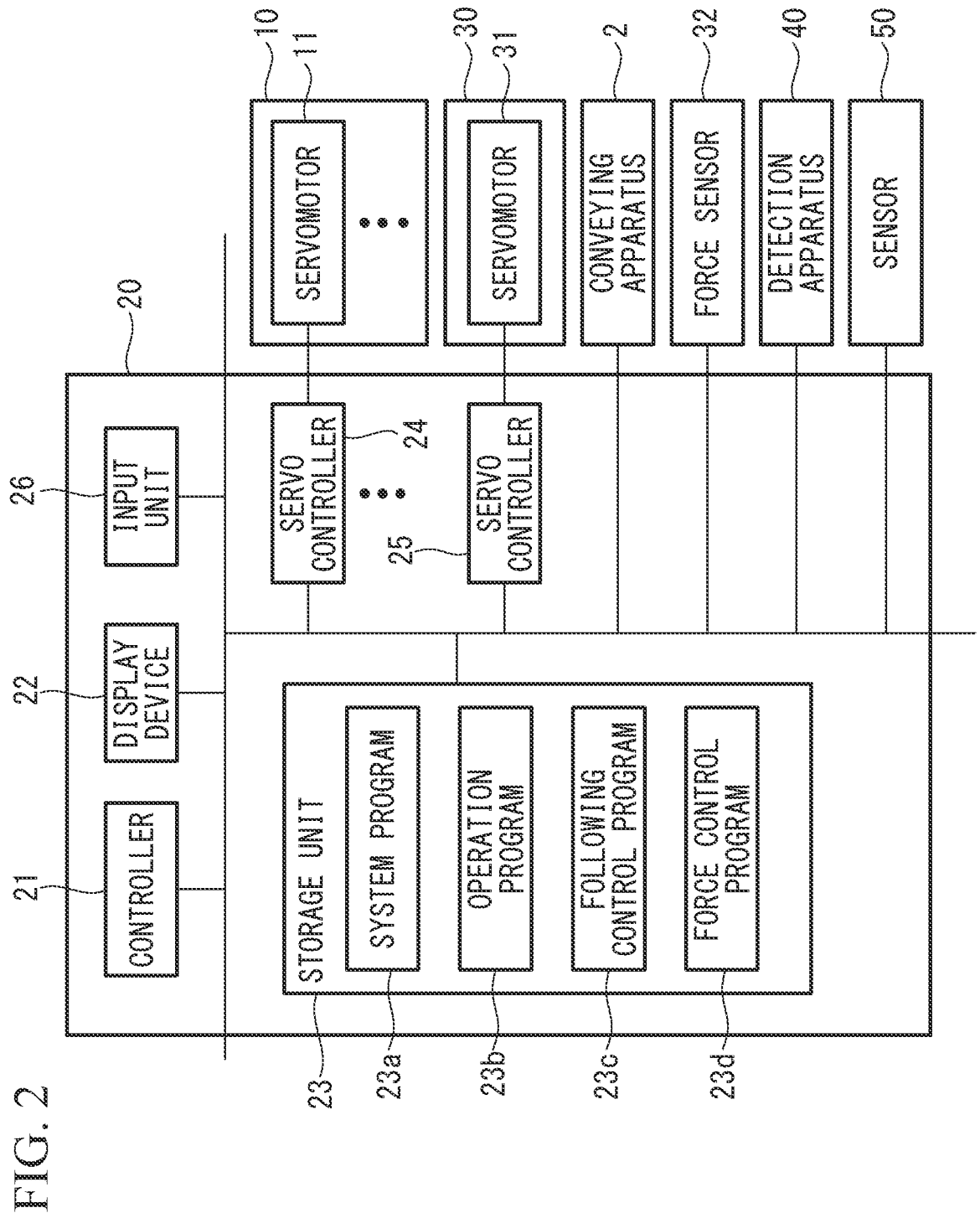
FIG. 2 is a block diagram of a control apparatus of the work robot system of the embodiment.

While the robot 10 is not limited to a specific type, the robot 10 of this embodiment includes a plurality of servomotors 11 that respectively drive a plurality of movable parts (see FIG. 2). Each servomotor 11 has an operating position detection device that detects an operating position of the servomotor 11, and for example, this operating position detection device is an encoder. Detection values of the operating position detection devices are transmitted to the control apparatus 20.

The hand 30 is mounted at a distal end of the robot 10. The hand 30 of this embodiment supports the part 110 by grasping the part 110 with a plurality of claws, but a hand that supports the part 110 by using a magnetic force, air suction, or other means can also be used.

The hand 30 includes a servomotor 31 that drives the claws (see FIG. 2). The servomotor 31 has an operating position detection device that detects an operating position of the servomotor 31, and for example, this operating position detection device is an encoder. A detection value of the operating position detection device is transmitted to the control apparatus 20.

As the servomotors 11, 31, various types of servomotors, including a rotary motor and a linear motor, can be used.

A force sensor 32 is mounted at the distal end portion of the robot 10. For example, the force sensor 32 detects forces in directions along an X-axis, a Y-axis, and a Z-axis shown in FIG. 3 and forces around the X-axis, the Y-axis, and the Z-axis. The force sensor 32 may be any sensor that can detect the direction and the magnitude of a force applied to the hand 30 or the part 110 grasped by the hand 30. For this purpose, the force sensor 32 is provided between the robot 10 and the hand 30 in this embodiment, but the force sensor 32 may instead be provided inside the hand 30.

Figure 3:
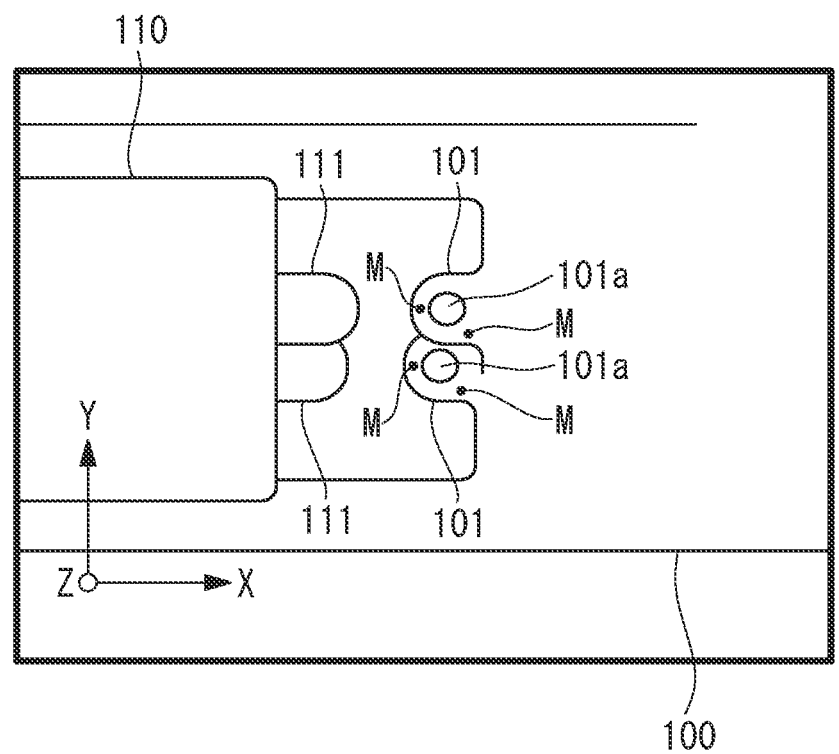
FIG. 3 is an example of image data captured by a detection apparatus of the work robot system of the embodiment.

The sensor 50 is mounted at the distal end side of the robot 10. In one example, the sensor 50 is mounted on a wrist flange of the robot 10 together with the hand 30. The sensor 50 is a two-dimensional camera, a three-dimensional camera, a three-dimensional distance sensor, or the like. The sensor 50 of this embodiment is a two-dimensional camera, and the sensor 50 is a sensor that successively acquires image data of the target portions 101 as shown in FIG. 3, in a state where the target portions 101 are located within a predetermined range of an angle of view. The sensor 50 successively transmits the image data to the control apparatus 20. The image data is data by which the position of at least one of the two target portions 101 can be specified. It is also possible to specify the orientations of the target portions 101, for example, based on the positional relationship between the two target portions 101 in the image data.

Positions and directions of a coordinate system of the sensor 50 and positions and directions of a coordinate system of the robot 10 are associated with each other in advance in the control apparatus 20. For example, the coordinate system of the sensor 50 is set as a reference coordinate system of the robot 10 that operates based on an operation program 23b. Relative to this reference coordinate system, a coordinate system having the origin at a tool center point (TCP) of the hand 30, a coordinate system having the origin at a reference position of the part 110, or the like, are represented.

As shown in FIG. 2, the control apparatus 20 includes: a controller 21 having a CPU, an RAM, etc.; a display device 22; a storage unit 23 having a non-volatile storage, an ROM, etc.; a plurality of servo controllers 24 respectively corresponding to the servomotors 11 of the robot 10; a servo controller 25 corresponding to the servomotor 31 of the hand 30; and an input unit 26 connected to the control apparatus 20. In one example, the input unit 26 is an input device, such as a operation panel, that an operator can carry. In some cases, the input unit 26 wirelessly communicates with the control apparatus 20.

A system program 23a is stored in the storage unit 23, and the system program 23a covers basic functions of the control apparatus 20. The operation program 23b is also stored in the storage unit 23. In addition, a following control program 23c and a force control program 23d are stored in the storage unit 23.

Figure 4:
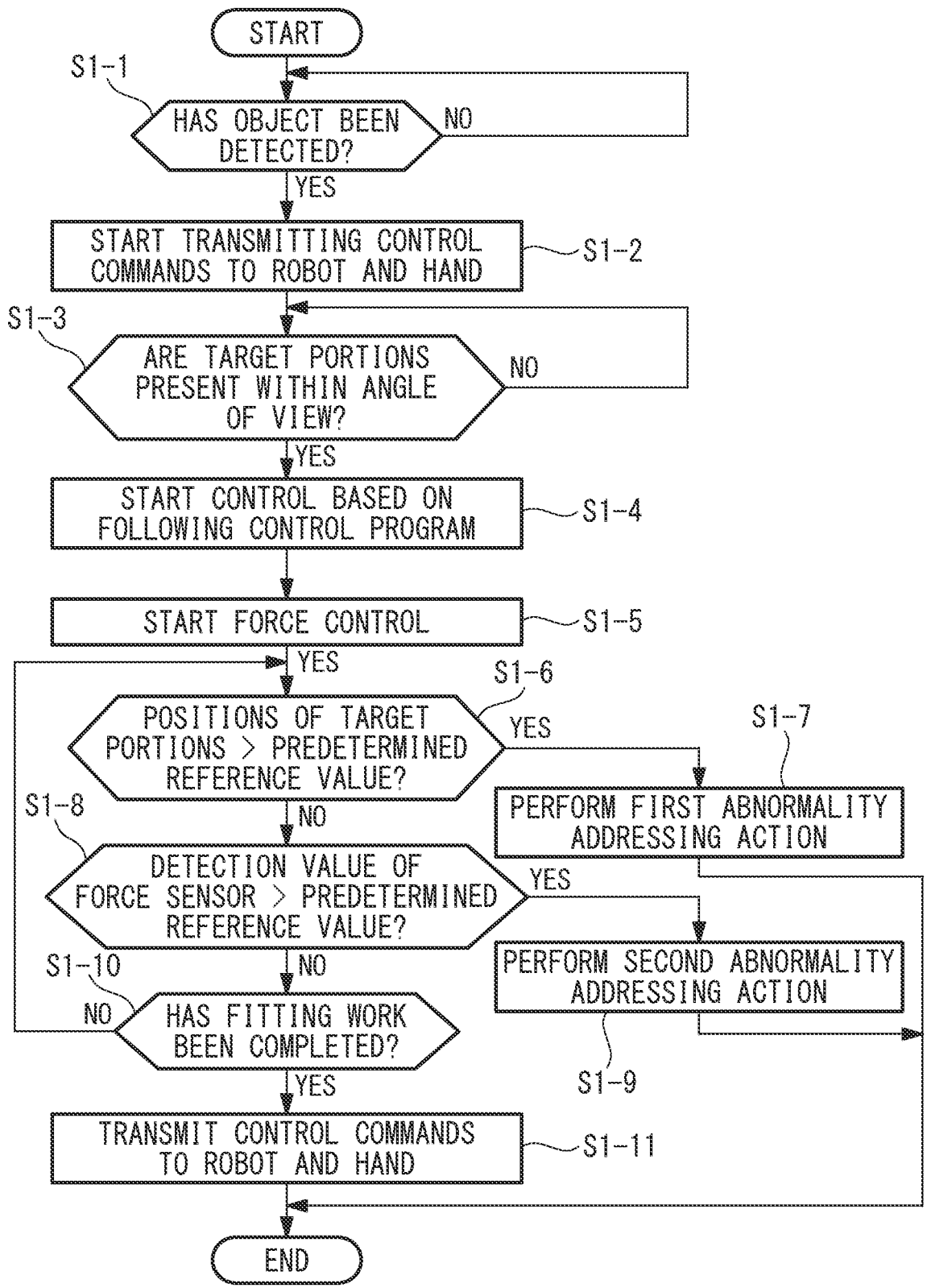
FIG. 4 is a flowchart showing operations of a controller of the work robot system of the embodiment.

Based on these programs, the controller 21 transmits control commands for performing the predetermined task on the object 100 to the servo controllers 24, 25. Accordingly, the robot 10 and the hand 30 perform the predetermined task on the object 100. Actions of the controller 21 in this process will be described with reference to the flowchart of FIG. 4.

First, when the object 100 has been detected by the detection apparatus 40 (step S1-1), the controller 21 starts transmitting control commands to the robot 10 and the hand 30 based on the operation program 23b (step S1-2). Accordingly, the object 110 is grasped by the hand 30, and the robot 10 brings the shafts 111a of the part 110 grasped by the hand 30 closer to the holes 101a of the target portions 101. In this case, the controller 21 may use data such as the transfer speed of the conveying apparatus 2 or the positions of the target portions 101 of the object 100, but does not need to use such data if the amount of transfer by the conveying apparatus 2 is within the range of the field of view of the sensor 50. After step S1-7 to be described later, the shafts 111a of the part 110 are fitted into the holes 101a of the object 100 based on the operation program 23b.

As a result of the control of the robot 10 in step S1-2, for example, the part 110 reaches the position and orientation for fitting as shown in FIG. 1. When the target portions 101 have thus become present within the angle of view of the sensor 50 (step S1-3), the controller 21 starts control based on the following control program 23c (step S1-4). For example, the following two modes of control can be used as this control. In the following two modes of control, the sensor 50 detects at least the positions of the target portions 101, and based on the detected positions, the controller 21 causes the distal end of the robot 10 to follow the target portions 101.

The first one is a mode of control in which the controller 21 causes the distal end of the robot 10 to follow the target portions 101, by constantly disposing a characteristic shape and/or a characteristic point of the object 100 at a predetermined position in the angle of view of the sensor 50. The second one is a mode of control in which the controller 21 causes the distal end of the robot 10 to follow the target portions 101, by detecting the actual position (the actual position relative to the robot 10) of the characteristic shape and/or the characteristic point of the object 100, and correcting the operation program 23b based on the difference between the position of the characteristic shape and/or the characteristic point and the actual position.

In the first mode of control, the controller 21 detects the characteristic shape and/or the characteristic point in the image data that is successively obtained by the sensor 50. The characteristic shape refers to the shape of the entire target portion 101, the shape of the hole 101a of the target portion 101, the shape of a mark M (FIG. 3) provided at the target portion 101, or the like. The characteristic point refers to a point indicating the position of the center of gravity of the hole 101a of the target portion 101, a point indicating the position of the center of gravity of the mark M provided at the target portion 101, or the like. When the distance between the sensor 50 and the target portion 101 in the Z-direction (the direction of viewing) changes, the characteristic shape changes in size while the characteristic point changes only a little or remains the same.

Then, using the image data successively obtained by the sensor 50, the controller 21 transmits, to the servo controller 24, control commands for constantly disposing the detected characteristic shape and/or characteristic point at the predetermined position in the image data.

In this case, it is preferable that the controller 21 use a characteristic shape and/or a characteristic point that is visible to the sensor 50 while the fitting work is performed, rather than a characteristic shape and/or a characteristic point that is invisible to the sensor 50 while the fitting work is performed. Alternatively, the controller 21 can change the characteristic shape and/or the characteristic point to be used for the following control, when this characteristic shape and/or characteristic point to be used for the following control becomes invisible to the sensor 50.

In the second mode of control, using the image data successively obtained by the sensor 50, the controller 21 detects the actual position of the characteristic shape and/or the characteristic point of the object 100 relative to a fixed coordinate system of the robot 10. Then, the controller 21 corrects teaching points of the operation program 23b which are taught with reference to the fixed coordinate system, based on the difference between the position of the characteristic shape and/or the characteristic point and the actual position.

In the first mode of control, the controller 21 may further calculate the amount of movement of the target portions 101. In this case, the controller 21 causes the distal end of the robot 10 to follow the target portions 101 by using also the calculated amount of movement.

The amount of movement of the target portions 101 is successively calculated, for example, based on the image data acquired by the sensor 50. The amount of movement of the target portions 101 is calculated, for example, by using the characteristic shape and/or the characteristic point appearing within the angle of view of the sensor 50.

The controller 21 conducts a matching process for matching characteristic points in a plurality of consecutive pieces of image data. Since the distal end of the robot 10 moves in the same direction as the object 100 in accordance with the operation program 23b, the position of the characteristic point changes little in the plurality of consecutive pieces of image data. However, when the transfer speed of the conveying apparatus 2 and the moving speed of the distal end of the robot 10 are not exactly equal, the distal end of the robot 10 and the object 100 move relative to each other. This relative movement is captured in the plurality of consecutive pieces of image data. Moreover, the amount of movement of the target portions 101 is successively calculated by using the moving speed of the distal end of the robot 10 and the relative speed of the distal end of the robot 10 relative to the target portions 101.

Figure 5:
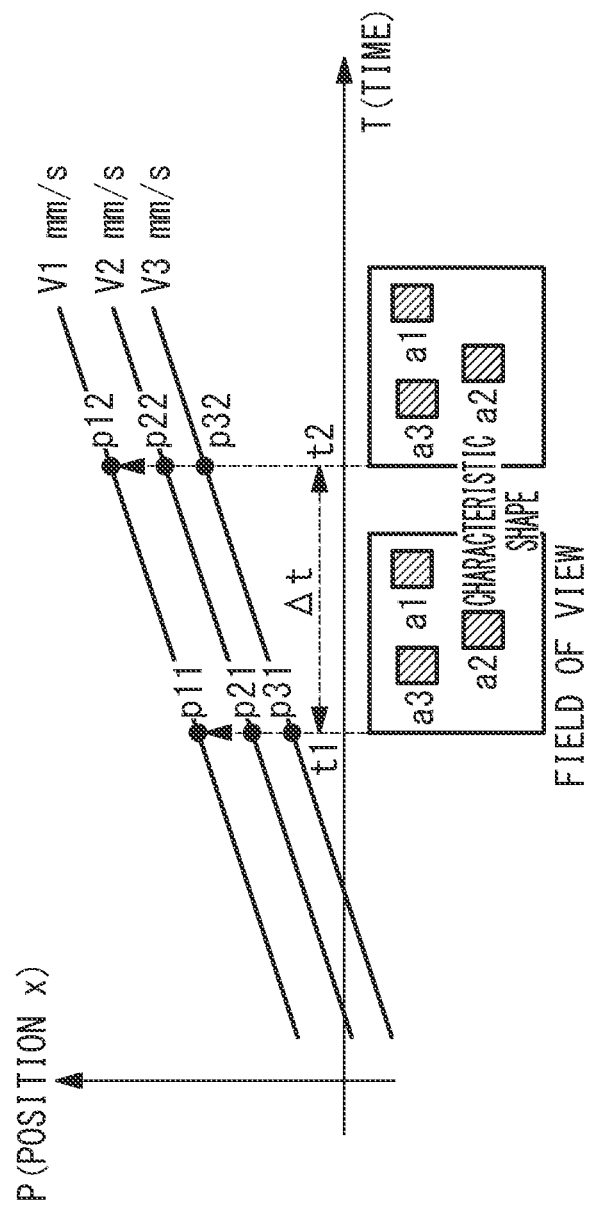
FIG. 5 is a diagram illustrating calculation of an amount of movement in the work robot system of the embodiment.

The moving speed of the distal end of the robot 10 is a moving speed based on the control commands from the controller 21. On the other hand, the moving speed of the distal end of the robot 10 relative to the target portions 101 is calculated based on the amount of movement of the characteristic shape and/or the characteristic point in the image data and the time taken for the movement. As shown in FIG. 5, when positions p11, p21, p31 of three characteristic shapes move respectively to positions p12, p22, p32, positions p13, p23, p33, and so on, the moving speed of each of the three characteristic shapes is calculated by fitting based on the least-squares method or the like. Alternatively, an average moving speed is calculated by averaging the moving speeds of the three characteristic shapes.

In the case where the amount of movement is calculated, even when the characteristic shape and/or the characteristic point used for the following control becomes invisible to the sensor 50, the controller 21 can cause the distal end of the robot 10 to follow the target portions 101 by using the amount of movement that has been calculated before the characteristic shape and/or the characteristic point becomes invisible.

In the second mode of control, the controller 21 may further interpolate the detection results of the actual positions of the characteristic shape and/or the characteristic point, for example, by using a trend of the calculated amount of movement or a trend of the detection result of the actual position. The actual position of the characteristic shape and/or the characteristic point is calculated based on image data that is actually captured by the sensor 50. Therefore, the acquisition cycle of the actual position is as long as the capturing cycle of the sensor 50. However, by interpolating the detection results, it is possible, for example, to detect or estimate the actual position during the acquisition cycle, or to estimate the actual position at a future moment.

By the above controls, the controller 21 causes the distal end of the robot 10 to follow the target portions 101. As a result, the target portions 101 are disposed at predetermined positions in the captured data acquired by the sensor 50. In this case, for example, the positions in a horizontal direction of the shafts 111a of the attachment portions 111 of the part 110 and the positions in the horizontal direction of the holes 101a of the target portions 101 coincide with each other.

Here, as described above, the coordinate system of the sensor 50 is set as the reference coordinate system of the robot 10 that is operated based on the operation program 23b. Accordingly, the reference coordinate system of the robot 10 moves in the conveying direction of the conveying apparatus 2, and the movement of the reference coordinate system coincides with the movement of the object 100 by the conveying apparatus 2. In this situation, the target portions 101 of the object 100 are being moved by the conveying apparatus 2, but when seen from the controller 21, the target portions 101 seem stationary in the reference coordinate system.

In the state thus controlled, the controller 21 starts the force control based on the force control program 23d (step S1-5). Publicly known force control can be used as the force control. In this embodiment, the robot 10 moves the part 110 in a direction away from a force detected by the force sensor 32. The amount of this movement is determined by the controller 21 according to the detection value of the force sensor 32.

For example, when the shafts 111a of the part 110 grasped by the hand 30 and the holes 101a of the object 100 start to fit, and in this situation a force in the opposite direction from the conveying direction of the conveying apparatus 2 is detected by the force sensor 32, the robot 10 slightly moves the part 110 in the opposite direction from the conveying direction, away from the detected force, while following the target portions 101 in the reference coordinate system.

Subsequently, when the positions of the target portions 101 relative to the robot 10 successively detected by the sensor 50 vary beyond a predetermined reference value (step S1-6), the controller 21 performs a first abnormality addressing action (step S1-7). The variation beyond the predetermined reference value is a significant movement of the target portion 101 in the image data, a movement at a speed higher than a predetermined speed of the target portion 101 in the image data, or the like. When power supply is not stable, the rotation speed of the motor 2a may decrease rapidly. Thus, the rotation speed of the motor 2a varies significantly in some cases. In such cases, the positions of the target portions 101 relative to the robot 10 vary beyond the predetermined reference value.

As the first abnormality addressing action, the controller 21 performs an action of shortening the control cycle, enhancing the sensitivity of the force control, an action of stopping the progress of fitting, an action of stopping the fitting work, etc. Shortening the control cycle or enhancing the sensitivity of the force control can cause the robot 10 to move with higher responsiveness upon application of a force to the part 110. In this embodiment, the controller 21 performs an action of stopping the fitting work, an action of stopping the conveying apparatus, or an action of a combination of these actions, etc.

When the detection value of the force sensor 32 exceeds a predetermined reference value (step S1-8), the controller 21 performs a second abnormality addressing action (step S1-9). When the detection value of the force sensor 32 exceeds the predetermined reference value, it is highly likely that an abnormal force is applied to the part 110, the object 100, etc. Therefore, as the second abnormality addressing action, the controller 21 performs an action of stopping the robot 10, an action of moving the robot 10 at a low speed in a direction away from the direction of the force detected by the force sensor 32, an action of stopping the conveying apparatus, or an action of a combination of these actions, etc. In this embodiment, the controller 21 performs an action of stopping the robot 10.

On the other hand, the controller 21 determines whether the fitting work has been completed (step S1-10), and when the fitting work has been completed, sends control commands to the robot 10 and the hand 30 (step S1-11). Accordingly, the hand 30 moves away from the part 110, and the hand 30 is moved by the robot 10 to a stand-by position or a place where a next part 110 is stocked.

Thus, in this embodiment, the position, relative to the distal end of the robot 10, of the target portions 101 of the object 100 being conveyed by the conveying apparatus 2 are successively detected by the sensor 50 mounted on the robot 10, and the robot 10 is controlled by using the detection result of the sensor 50. Therefore, even in the absence of force control, the controller 21 may be able to recognize the positional relationship between the object 100 and the part 110 supported by the robot 10, and to recognize whether the two are in contact with each other. For example, the controller 21 can recognize, in the absence of force control, an abnormality of the conveying apparatus 2 in which the amount the object 100 is moved by the conveying apparatus 2 varies significantly. It is therefore possible to realize prevention of damage to the robot 10, the conveying apparatus 2, the object 100, etc. without unreasonably shortening the control cycle, or enhancing the sensitivity, of the force control, and also to suppress oscillation of the robot 10.

In this embodiment, the controller 21 performs the force control by using the detection value of the force sensor 32, while causing the part 110 supported by the robot 10 to follow the target portions 101 by using the detection result of the sensor 50.

Thus, the controller 21 causes the part 110 of the robot 10 to follow the target portions 101 by using the detection result of the sensor 50. In this way, when the robot 10 is performing the predetermined task, the controller 21 can accurately control the position and the orientation of the part 110 supported by the robot 10, relative to the target portions 101 of the object 100 being conveyed by the conveying apparatus 2. This is advantageous in realizing prevention of damage to the robot 10, the conveying apparatus 2, the object 100, etc. without shortening the control cycle, or enhancing the sensitivity, of the force control, and also in suppressing oscillation of the robot 10.

In this embodiment, the detection apparatus 40 that detects at least the positions of the target portions 101 of the object 100 on the conveying apparatus 2 is provided, and the controller 21 brings the part 110 supported by the robot 10 closer to the target portions 101 based on the detection result of the detection apparatus 40. The work efficiency is improved by the robot 10 thus operating based on the detection result of the detection apparatus 40. In this case, the controller 21 may also use the detection result of the operating position detection device 2b to bring the part 110 supported by the robot 10 closer to the target portions 101. When the detection result of the operating position detection device 2b is also used, the accuracy of the control of bringing the part 110 closer to the target portions 101 is enhanced.

While the detection apparatus 40 is a photoelectric sensor in this embodiment, the detection apparatus 40 may instead be, for example, a two-dimensional camera, a three-dimensional camera, or a three-dimensional distance sensor that is disposed above, on a side of, or below the conveying apparatus 2, or a sensor that measures the shape of an object by emitting linear light to the object. When the detection apparatus 40 is a two-dimensional camera, the controller 21 may be able to recognize the positions and the orientations of the target portions 101 of the object 100 being conveyed by the conveying apparatus 2, based on image data that is a detection result of the detection apparatus 40. Thus, the controller 21 can more accurately bring the shafts 111a of the part 110 closer to the holes 101a of the target portions 101 in step S1-2.

A processing tool may be supported at the distal end of the robot 10, and the robot 10 may perform processing as the predetermined task on the object 100 being conveyed by the conveying apparatus 2. In this case, the processing tool refers to a drill, a milling cutter, a drill tap, a deburring tool, or other tools. Also in this case, effects similar to those described above can be achieved as, for example, the processing tool is brought closer to the target portions 101 in step S1-2 and the force control is performed according to contact between the processing tool and the target portions 101 in step S1-7.

In step S1-4, the controller 21 can also use the positions of the target portions 101 in the image data, the moving speed and direction of the target portions 101 in the image data, etc. to cause the distal end of the robot 10 to follow the target portions 101. Other publicly known methods can also be used to cause the distal end of the robot 10 to follow the target portions 101. Effects similar to those described above can be achieved also when such a configuration is used.

It is also possible to use, as the conveying apparatus 2, a conveying apparatus that conveys the object 100 along a curvilinear route, or a conveying apparatus that conveys the object 100 along a winding route. In these cases, the controller 21 also can cause the distal end of the robot 10 to follow the target portions 101 by using the detection result of the sensor 50. When the positions of the target portions 101 relative to the robot 10 vary beyond the predetermined reference value in step S1-6, the controller 21 can perform the first abnormality addressing action in step S1-7. Thus, effects similar to those described above can be achieved also when the above conveying means are used.

To acquire the amount of movement in step S1-4, the amount of movement is calculated based on the image data that is captured by the sensor 50 in reality. Therefore, if the acquisition cycle of the amount of movement is matched with the capturing cycle of the sensor 50, the acquisition cycle of the amount of movement will become as long as the capturing cycle of the sensor 50. However, it is also possible to interpolate the amount of movement that is successively calculated based on the data captured by the sensor 50. For example, the controller 21 specifies a variation trend of the amount of movement by using a calculation result of a plurality of consecutive amounts of movement. Then, the controller 21 can set an interpolating amount of movement between one amount of movement and another along the specified trend.

In step S1-9, the controller 21 may perform, as the second abnormality addressing action, an action such as stopping the motor 2a of the conveying apparatus 2 or decelerating the motor 2a of the conveying apparatus 2.

In this embodiment, the force sensor 32 is mounted at the distal end of the robot 10. However, it is also possible to dispose the force sensor 32, for example, between the conveying apparatus 2 and the object 100 or inside the object 100. Also in this case, the force control based on the detection value of the force sensor 32 can be performed, and effects similar to those described above can be thereby achieved.

The sensor 50 may be mounted at a part of the robot 10 other than the wrist flange. Also in this case, the controller 21 can recognize the positional relationship between the part 110 supported by the robot 10 and the object 100 being conveyed by the conveying apparatus 2 based on the detection result of the sensor 50. Thus, effects similar to those described above can be achieved.

The following aspects are derived from the above disclosure.

A work robot system of an aspect of the present invention includes: a conveying apparatus that conveys an object; a robot that performs a predetermined task on a target portion of the object being conveyed by the conveying apparatus; a controller that controls the robot; a sensor that is attached to the robot and detects a position, relative to the robot, of the target portion of the object being conveyed by the conveying apparatus; and a force detector that detects a force generated by contact between the object and a part or a tool supported by the robot, wherein when the robot is performing the predetermined task, the controller performs force control based on a detection value of the force detector while controlling the robot by using a detection result of the sensor.

In the above aspect, the position, relative to the robot, of the target portion of the object being conveyed by the conveying apparatus is detected by the sensor attached to the robot, and the robot is controlled by using the detection result of the sensor. Thus, even in the absence of force control, the controller may be able to recognize the positional relationship between the object and the part or the tool supported by the robot, and to recognize whether the two are in contact with each other. For example, the controller can recognize, in the absence of force control, an abnormality of the conveying apparatus in which the moving amount the object moved by the conveying apparatus varies significantly. It is therefore possible to realize prevention of damage to the robot, the conveying apparatus, the object, etc. without unreasonably shortening the control cycle of force control, and also to suppress oscillation of the robot.

In the above aspect, preferably, the controller may perform the force control by using the detection value of the force detector, while causing the part or the tool supported by the robot to follow the target portion by using the detection result of the sensor.

Thus, the controller causes the part or the tool of the robot to follow the target portion by using the detection result of the sensor. In this way, when the robot is performing the predetermined task, the controller can accurately control the position and the orientation of the part or the tool supported by the robot, relative to the target portion of the object being conveyed by the conveying apparatus. This is advantageous in realizing prevention of damage to the robot, the convey-ing apparatus, the object, etc. without shortening the control cycle, or enhancing the sensitivity, of the force control, and also in suppressing oscillation of the robot.

In the above aspect, preferably, the work robot system may further include a detector that detects at least a position of the target portion of the object on the conveying apparatus, and the controller may bring the part or the tool of the robot closer to the target portion based on a detection result of the detector.

This aspect is advantageous in accurately performing the control of bringing the part or the tool supported by the robot closer to the target portion.

In the above aspect, preferably, at least one of the controller and the conveying apparatus may perform an abnormality addressing action when the position of the target portion relative to the robot detected by the sensor varies beyond a predetermined reference value.

According to this aspect, in the state where the positional relationship between the object and the part or the tool supported by the robot is recognized as described above, the controller further performs the abnormality addressing action based on the detection result of the sensor. This configuration is advantageous in reliably realizing prevention of damage to the robot, the conveying apparatus, the object, etc., and also in suppressing oscillation of the robot.

The above aspects can efficiently realize prevention of damage to the robot, the conveying apparatus, the object, etc.

The invention claimed is:

1. A work robot system comprising:
   a conveyer configured to convey an object along a predetermined route;
   a robot configured to perform a predetermined task on a target portion of the object that is moving by the conveyer;
   a controller configured to control the robot;
   a first visual sensor that is attached to a distal end of the robot;
   a second sensor that is located at a position along the predetermined route; and
   a force sensor configured to detect a force generated by contact between the object and a part or a tool supported by the robot, wherein the controller is further configured to:
   set a coordinate system of the first visual sensor as a coordinate system of the robot;
   move the coordinate system of the robot in response to a movement of the target position;
   obtain at least a three-dimensional position of the target portion based on an output of the second sensor;
   control the robot to bring the part or the tool supported by the robot closer to the target portion based on the obtained position; and
   perform a force control based on a detection value of the force sensor while performing a follow control of making at least the distal end of the robot to follow the target portion that is moving by the conveyer when the robot is performing the predetermined task.

2. The work robot system according to claim 1, wherein the controller is further configured to:
   perform the follow control by disposing the target portion of the object, a characteristic shape of the object, or a characteristic point of the object, which are moving by the conveyer, at a predetermined position in an angle of view of the first visual sensor.

3. The work robot system according to claim 1, wherein the controller is further configured to:

start the force control and start bringing the part or the tool into contact with the target portion for performing the predetermined task when the at least the distal end of the robot is brought into a state of following the target portion.

4. The work robot system according to claim 1, wherein the controller is further configured to:
calculate an amount of movement of the target portion based on an output of the first visual sensor, an output of the second sensor as a visual sensor, or an output of another visual sensor, and
utilize the calculated amount of movement in the follow control.

5. The work robot system according to claim 1, wherein at least one of the controller and the conveyer is further configured to:
perform an abnormality addressing action when the position of the target portion relative to the robot detected by the first visual sensor varies beyond a predetermined reference value.

6. The work robot system according to claim 1, wherein the second sensor is a photoelectric sensor.

7. A work robot system comprising:
a conveyer configured to convey an object along a predetermined route;
a robot configured to perform a predetermined task on a target portion of the object that is moving by the conveyer;
a controller configured to control the robot;
a first visual sensor that is attached to a distal end of the robot;
a second sensor that is located at a position along the predetermined route; and
a force sensor configured to detect a force generated by contact between the object and a part or a tool supported by the robot, wherein the controller is further configured to:
obtain at least a position of the target portion based on an output of the second sensor;
calculate an amount of movement of the target portion between a current position of the target portion being conveyed by the conveyer and the position of the target portion at a time of the output of the second sensor;
perform an approach control of controlling the robot to bring the part or the tool supported by the robot closer to the target portion based on the obtained position and the amount of movement; and
perform force control based on a detection value of the force sensor while performing a follow control of keeping a relative position between at least the distal end of the robot and the target portion when the robot is performing the predetermined task, wherein the controller is configured to perform the follow control by disposing the target portion of the object, a characteristic shape of the object, or a characteristic point of the object, which are moving by the conveyer, at a predetermined position in an angle of view of the first visual sensor.

8. The work robot system according to claim 7, wherein the controller is further configured to:
conduct a successive calculation of the amount of movement based on an output of the first visual sensor, an output of the second sensor, or an output of a detection device provided in the conveyer.

9. The work robot system according to claim 8, wherein the controller is further configured to:
calculate interpolated values for interpolating the amount of movement based on values of the amount of movement which are obtained by the successive calculation, and
perform the approach control based on the obtained position, the amount of movement, and the interpolated values.

10. The work robot system according to claim 7, wherein the first visual sensor is a two-dimensional visual sensor.

11. The work robot system according to claim 10, wherein the controller is further configured to:
start the force control; and
start bringing the part or the tool into contact with the target portion for performing the predetermined task when the at least the distal end of the robot is brought into a state of following the target portion.

12. The work robot system according to claim 10, wherein the predetermined route is a curvilinear route or a winding route.

13. The work robot system according to claim 10, wherein the controller is further configured to:
shorten a control cycle of the force control when the position of the target portion relative to the robot detected by the first visual sensor varies beyond a predetermined reference value.

14. The work robot system according to claim 7, wherein the second sensor is a photoelectric sensor.

* * * * *